UNITED STATES PATENT OFFICE.

DANIEL R. PRINDLE, OF EAST BETHANY, NEW YORK.

IMPROVED PROCESS OF PRESERVING WOOD AND TIMBER.

Specification forming part of Letters Patent No. 63,300, dated March 26, 1867; Reissue No. 3,620, dated August 24, 1869.

*To all whom it may concern:*

Be it known that I, DANIEL R. PRINDLE, of East Bethany, in the county of Genesee and State of New York, have invented a new and Improved Process for Preserving Wood, Timber, and other Fibrous or Porous Materials; and I do hereby declare that the following is a full and exact description thereof.

The nature of my invention consists in treating wood, timber, or other porous materials liable to decay by first charging or saturating it with coal-tar, common tar, or other equivalent preservative substance or substances, and then coating or covering the surface of the same with a material or materials of sufficient consistency or body for the purpose of furnishing a permanent outer protection therefor against the destructive effects of air and moisture, the application being made in such a manner as first to expel any remaining moisture in the wood or material, if not thoroughly seasoned, and occupy its place, and then to coat the same wholly or partially in the manner herein described; also, in connection with the above, in subjecting the wood or material to heat sufficient to season it, if not previously seasoned, and coagulate the albuminous matter therein. Some kinds of timber and material previously seasoned may be preserved without heating—say, by soaking it in a preserving liquid that is sufficiently thin when cold to penetrate and occupy the pores, thus charging instead of boiling.

I will proceed to describe a simple and inexpensive mode of applying the invention.

After preparing a suitable boiler or vessel to contain the wood, timber, or other material to be treated, I place therein with the same the substance or substances to be used in saturating it—such as coal-tar, common tar, or any equivalent resinous, oily, or other substance of a preservative nature—and which is or may be made sufficiently liquid to penetrate the pores of the material. If the substance is not sufficiently liquid at the ordinary temperature, I apply heat enough to the boiler or vessel to render it so, and I keep the heat up to as high a temperature as the substances or circumstances will safely allow, until the wood or material is fully or sufficiently charged with the preservative substance. Some articles or materials—such as fence-posts, hop-poles, &c.—may be only partially immersed in the preservative substance, so that the heat will gradually expel the sap or moisture upward therefrom, before the preservative substance rises through and occupies the pores thereof. The vegetable albumen, which, in its unchanged state, is liable to early decay, is at the same time coagulated or rendered insoluble and durable by the heat applied.

The timber or material after this treatment is removed from the vessel and then, or at any time thereafter, when wanted for use, is coated over with some substance which will leave a permanent outer covering, and thus exclude air and moisture from the pores, and thereby furnish a durable protection for the material.

If the substances used for first saturating the material are, when cold, sufficiently dense for the purpose, no other material or additional ingredient need be employed. Thus the residuum of tar may be used, applied while hot; or, if some additional substance is required to give body and more consistence, such may be added, as much as necessary and of any suitable kind, and the whole may or may not be covered with fine sand, or equivalent, properly applied to the surface.

The tar residuum or other substance used in coating is many times conveniently applied over the vessel used in first seasoning or saturating the wood or other material, so that the melting or coating may be easily effected and the drippings caught and saved. This coating is most essential on all those portions of timber or material exposed to the weather, and especially those parts which are, from their structure, most likely to absorb air and moisture—such as the ends of wood blocks for pavement, shingles, &c.; or, as with fence-posts, those parts used near the surface or in the ground or water.

I do not claim the simple saturation of wood or other materials with tar or other preservative substance or substances, of proper consistence, separately, and, though the durable and preservative qualities of coal-tar and common tar are peculiarly valuable in such a process, I do not confine myself to their use, since other substances of like resinous and oily nature, possessing equivalent properties, may be substituted therefor or added thereto; but

What I claim as my invention, and desire to secure by Letters Patent, is—

1. The process of first charging or saturating wood or other porous material with any substance or substances of preservative qualities, and subsequently coating or covering the same with any suitable substance or substances of proper consistency, in the manner and for the purpose herein specified.

2. Seasoning the wood or material by heat applied prior to or during the process, as specified.

The above specification of my improved process of preserving wood and timber signed by me this 6th day of March, 1869.

D. R. PRINDLE. [L. S.]

Witnesses:
A. R. WARNER,
ISAAC WARNER.